(12) United States Patent
Wenzler

(10) Patent No.: US 9,659,288 B1
(45) Date of Patent: May 23, 2017

(54) SYSTEM AND METHOD FOR PROVIDING MEASUREMENT TOOL AT POINT OF SALE

(71) Applicant: Timothy Wenzler, San Diego, CA (US)

(72) Inventor: Timothy Wenzler, San Diego, CA (US)

(*) Notice: Subject to any disclaimer, the term of this patent is extended or adjusted under 35 U.S.C. 154(b) by 0 days.

(21) Appl. No.: 15/376,544

(22) Filed: Dec. 12, 2016

Related U.S. Application Data

(60) Provisional application No. 62/268,822, filed on Dec. 17, 2015.

(51) Int. Cl.
| | |
|---|---|
| *G06Q 20/20* | (2012.01) |
| *G06K 17/00* | (2006.01) |
| *G06K 19/06* | (2006.01) |
| *G07G 1/00* | (2006.01) |
| *G07G 5/00* | (2006.01) |
| *B41J 11/48* | (2006.01) |
| *G06K 7/14* | (2006.01) |

(52) U.S. Cl.
CPC ......... *G06Q 20/209* (2013.01); *G06K 7/1413* (2013.01); *G06K 19/06028* (2013.01); *G07G 1/0072* (2013.01); *G07G 5/00* (2013.01); *B41J 11/48* (2013.01); *G07G 1/0045* (2013.01)

(58) Field of Classification Search
None
See application file for complete search history.

(56) References Cited

U.S. PATENT DOCUMENTS

| | | | |
|---|---|---|---|
| 5,531,028 A | 7/1996 | Flippen | |
| 7,188,154 B2 | 3/2007 | Minowa | |
| 2001/0032266 A1 | 10/2001 | Minowa | |
| 2002/0170782 A1* | 11/2002 | Millikan | ................ A47F 9/048 186/61 |
| 2009/0026270 A1 | 1/2009 | Connell, II et al. | |
| 2012/0134735 A1* | 5/2012 | Kobayashi | ................ B41J 3/60 400/621 |

OTHER PUBLICATIONS

Sonofax, snapshot taken Aug. 12, 2015, available at http://web.archive.org/web/20150812041308/http://www.sonofax.com/catalog/pre-printed-standard-petrol-station-paper-roll, discloses receipt papers with repetitive designs printed in a margin.*

* cited by examiner

*Primary Examiner* — Allen Chein
(74) *Attorney, Agent, or Firm* — Jafari Law Group, Inc.

(57) ABSTRACT

The present invention is generally a system and method for providing a measurement device with a point of sale (POS) receipt. In exemplary embodiments, a store such as a building supply store or hardware store, may implement POS devices configured to generate printed media that may be used by customers as a measuring tool. The measuring tool may comprise a printed sheet with measurement markings printed along a longitudinal border of the printed sheet adjacent to transactional information of a registered purchase, and or promotional information that may be relevant to the customer.

15 Claims, 5 Drawing Sheets

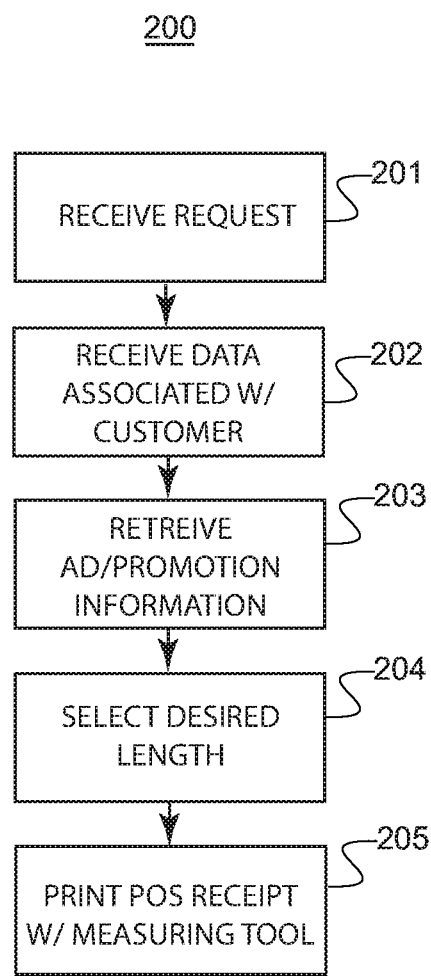

401  402  403

SYSTEM AND METHOD FOR PROVIDING MEASUREMENT TOOL AT POINT OF SALE

PRIORITY NOTICE

The present application claims priority under 35 U.S.C. §119(e) to U.S. Provisional Patent Application with Ser. No. 62/268,822, filed on Dec. 17, 2015, the disclosure of which is incorporated herein by reference in its entirety.

TECHNICAL FIELD OF THE INVENTION

The present invention relates in general to a system and method for providing a measurement tool, and more specifically, to a system and method for providing a measurement tool with a point of sale (POS) receipt, in which advertising materials or promotional information may be provided to customers.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

It is common for customers at certain stores, for example building supply stores or hardware stores, to purchase products for which measurements are required. In certain situations, a measurement tool such as a tape measure is desirable because the customer may need to either measure a particular product, or measure a particular space when considering whether to purchase an item.

A well-prepared customer may bring their own measuring device to the store, for example a tape measure. However, there are customers that may visit a store for one purpose and see an item that they need or desire but which was not part of that customer's anticipated purchase; other customers may simply forget their measuring device at home. Often, that customer then realizes that a measuring tool is desirable, and must either go home and return with a measuring tool, or ask a customer representative at the store for assistance. Although this appears to be an adequate solution for customers that either don't think ahead, or unexpectedly decide to purchase an unanticipated item, stores may nonetheless be losing out on potential customers that may decide not to bother with either returning to the store that day, or ask a customer representative for assistance.

To avoid losing potential customers that may decide to return to the store at a later time, a store—such as a hardware store—may provide measuring tools such as a tape measure. However, providing a tape measure means providing their customers with a product that is likely expensive or has significant costs. Moreover, ensuring that all their customers are given a tape measure may prove costly. Similarly, relying on customer representatives to be available for all customers is not always efficient, especially during busy times of the year during which not enough customer representatives are available to assist every potential customer. Finally, customers may be easily dissuaded from a purchase if they are required to ask for a measuring tool or ask for help, and thus the store may lose a purchasing opportunity. Thus, it is desirable to provide customers with a measuring tool in an inexpensive manner so as to preserve a purchasing opportunity or even generate unanticipated purchasing opportunities.

Similarly, stores are always looking for ways to make their promotions available to their customers or potential customers. As such, several methods may be implemented including for example, providing coupons via mailers or via publications such as magazines offered directly at the store. However, these methods are not adequate at attracting customers that may visit a store with a particular purpose, as those customers are unlikely to pick up coupons or published materials for items that they do not anticipate purchasing. Thus, it is always desirable to provide customers with promotional information in an inexpensive manner so as to generate unanticipated purchasing opportunities.

Accordingly, there is an unanticipated need for a system and method that enables stores to provide customers with a measurement tool, in a manner that is inexpensive and that may help bring additional revenue, and which can facilitate their customers with measurements that may be desirable in deciding whether to purchase an item. Furthermore, there is an ever-increasing need to provide customers with promotional information to capture or generate purchases from unanticipated purchasing opportunities.

Therefore, there are several problems with the current state of the art that have not been adequately addressed. The problems persist because a need to provide measuring tools has not been adequately met, and there is always a need for new ways to advertise a store's promotional items. It is to these ends that the present invention has been developed.

SUMMARY OF THE INVENTION

To minimize the limitations in the prior art, and to minimize other limitations that will be apparent upon reading and understanding the present specification, the present invention describes a system and method for providing a measurement device with a point of sale (POS) receipt, in which advertising materials or promotional information may be provided to customers.

A system for providing a measurement tool at a point of sale (POS), in accordance with an exemplary embodiment of the present invention, comprises: a scanner; a computing device in communication with the scanner, the computing device configured to: receive a scan of a barcode of an item from the scanner; determine an identity of the item based on the barcode; and generate a printed medium comprising: a printing medium; price information associated with the item printed on the printing medium; and a plurality of measurement markings situated along a longitudinal border of the printing medium.

A measuring tool generated by a point of purchase (POS) device, in accordance with an exemplary embodiment of the present invention, comprises: a printing medium including horizontal and vertical borders; price information associated with a purchasable item printed on the printing medium; and a plurality of measurement markings situated along a longitudinal border of the printing medium.

A method performed by a computing device configured to generate a measurement tool with a point of purchase (POS) receipt, in accordance with practice of the present invention, comprising: receiving a scan of a barcode of an item from a scanner; determining an identity of the item based on the barcode; and generating a printed medium comprising: a printing medium; price information associated with the item printed on the printing medium; and a plurality of measurement markings situated along a longitudinal border of the printing medium.

A system for providing a measurement device on a printed medium, in accordance with an exemplary embodiment of the present invention, comprises: a computing device with access to a database including promotional information associated with one or more products; and a printing device in communication with the computing device, wherein the computing device is configured to: register transactional data associated with a product purchase from a customer; retrieve the promotional information associated with one or more products; and generate a printed medium of a predetermined length, the printed medium including the promotional information, and a plurality of measurement markings longitudinally printed along one or more borders of the printed medium.

A method performed by a computing device configured to generate a measurement tool with a computing device, in accordance with practice of an exemplary embodiment of the present invention, comprises: registering transactional data associated with a product purchase from a customer; receiving promotional information from one or more advertising affiliates; and generating a printed medium of a predetermined length, the printed medium including the transactional data, the promotional information, and a plurality of measurement markings longitudinally printed along one or more borders of the printed medium.

A measuring tool printed with a computing device, in accordance with an exemplary embodiment of the present invention, comprises: a printing medium including horizontal and vertical borders; transactional or promotional data printed on the printing medium; and a plurality of measurement markings longitudinally situated along the vertical boarders of the printing medium.

It is an objective of the present invention to provide a printed medium that may be used as a measuring tool.

It is another objective of the present invention to provide a printed medium that facilitates communicating advertising materials or promotional information to new or returning customers.

It is yet another objective of the present invention to provide a method for capitalizing on unanticipated purchasing opportunities.

It is yet another objective of the present invention to provide a method for providing store customers with a means to measure items of interest.

It is yet another objective of the present invention to provide a method for distributing promotional materials from advertising affiliates via medium that facilitates customers with their purchases.

These and other advantages and features of the present invention are described herein with specificity so as to make the present invention understandable to one of ordinary skill in the art.

BRIEF DESCRIPTION OF DRAWINGS

Elements in the figures have not necessarily been drawn to scale in order to enhance their clarity and improve understanding of these various elements and embodiments of the present invention. Furthermore, elements that are known to be common and well understood to those in the industry are not depicted in order to provide a clear view of the various embodiments of the invention.

FIG. 2 illustrates a method in accordance with the present invention for providing customers with a measuring tool integrated with a POS receipt.

DESCRIPTION OF THE INVENTION

Figure 1A:
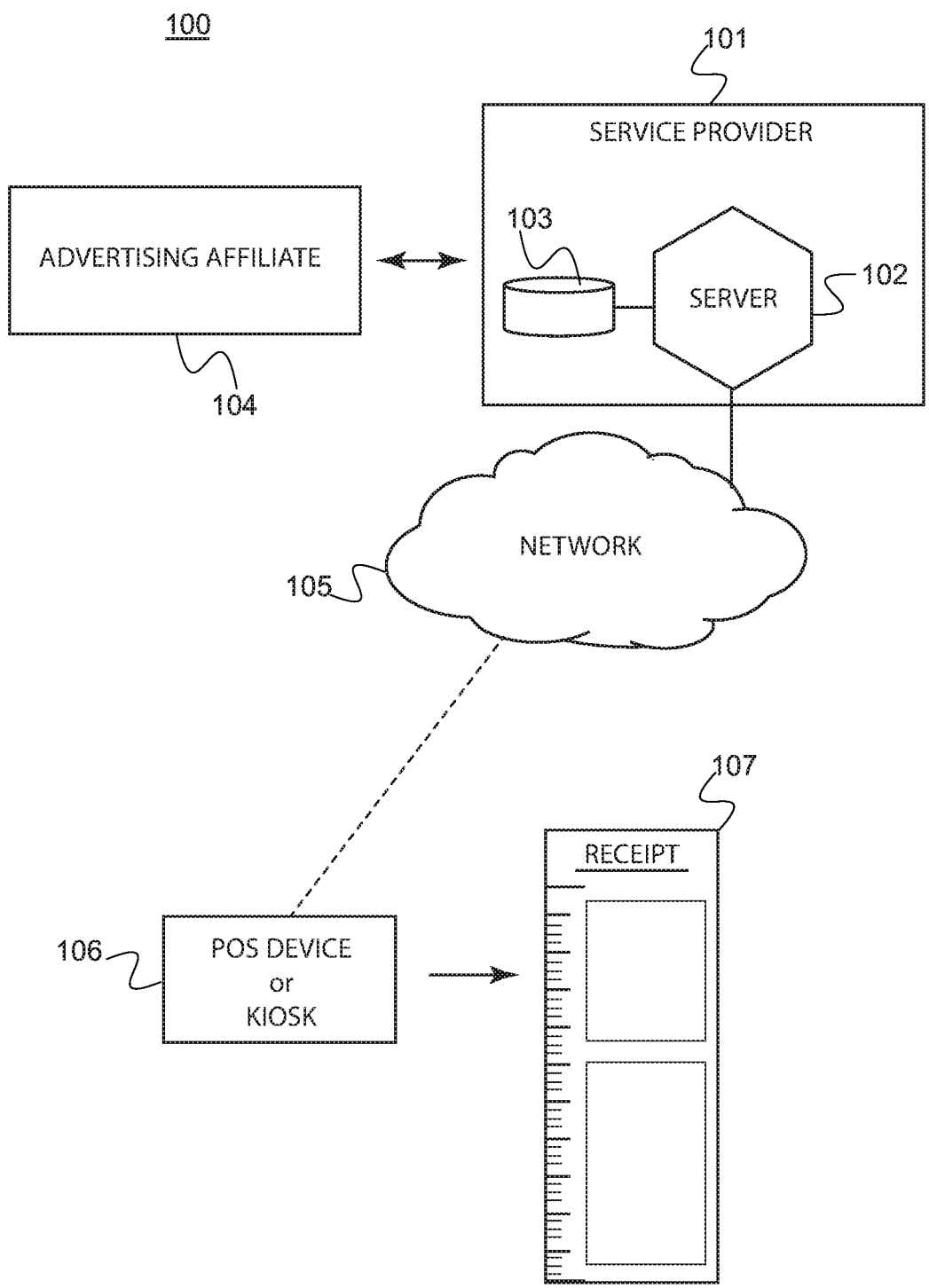
FIG. 1(a) illustrates a system in accordance with an exemplary embodiment of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Generally, the present invention involves a system and method for providing a measurement tool with a POS receipt. In exemplary embodiments of the present invention, a store such as a building supply store, may implement POS devices configured to generate printed media that may be used by customers as a measuring tool. In such embodiments, the generated printed medium may comprise of printed sheets that include a plurality of measurement markings along a longitudinal border of the printed sheets. In other embodiments, a service provider such as a hardware store, or even an advertising or marketing entity servicing a hardware store, may implement a system whereby advertisements or promotional information concerning the store or associated products are provided to customers of the store via printed POS receipts that include the measuring tool. As mentioned above, the measuring tool may be printed along a longitudinal edge, margin or border of a printed medium such as a printed sheet and may include transactional information of a registered purchase along with advertising or promotional information that may be relevant to the customer. Of course, embodiments of the printed medium may vary without deviating from the scope of the present invention. For example, different measurement markings, numbers, or symbols may be incorporated, or different types of measurement systems may be included without deviating from the scope of the present invention. As such, several embodiments of the system and method, as well as several embodiments of a measurement tool in accordance with the present invention are discussed below.

Turning now to the figures, FIG. 1(a) illustrates a system in accordance with one embodiment of the present invention, wherein a service provider hosts a server and database of advertising affiliates, which may be used as a source of promotional information to include in the printed medium in which a measurement tool is printed for customers. At the physical location were a store associated with the service provider may be located, a POS device or kiosk, such as a cashier register machine or a station including a computing device, may be provided. In the shown illustration, system 100 comprises service provider 101, including server 102 and database or storage 103 for storing pricing information and or promotional information provided by advertising affiliate 104 (which may be an unrelated or related entity of service provider 101). A network 105 may be implemented such as the Internet, for communicating relevant promotional information between server 102 and device 106, which is typically located at the brick-n-mortar store.

Typically, a customer making a purchase at a store, which implements the present invention, may be provided with a printout POS receipt documenting that customer's purchase. The POS receipt may comprise of a printed medium such as a printed sheet on which the transactional information appears. Along with the transactional information, one or more of the borders of the printed sheet may include markings longitudinally placed so that the markings may be used as a measuring tool. For example, and without limiting the scope of the present invention, the markings may comprise of line markings spaced using the metric system so that the markings along the border of the printed sheet may be used to measure a distance in centimeters. In alternative embodiments, the markings may comprise of line markings spaced using the English system so that the markings along the border of the printed sheet may be used to measure a distance in inches. Of course, any type of measurement system may be implemented, or even multiple systems may be implemented on the same printed medium, without limiting the scope of the present invention (i.e. see further discussion below).

In addition to the measurement markings, the printed medium typically includes transactional data or transactional information concerning purchased items or items for which pricing information is requested. Moreover, the printed medium may typically include promotional data, such as promotional information concerning offers, coupons, on-sale items, or any other promotional or advertising materials that the service provider may wish to include on the POS receipt. One benefit of providing a measurement tool in a printed medium such as a printed POS receipt is that customers often hang on to their receipt for various reasons, including for re-visiting the store to return or exchange a previously purchased item. Customers may keep printed POS receipts in their wallet, their vehicle or at home; as such a printed POS receipt that implements a measurement tool will be readily available for customers to bring with them upon returning to a store.

In one embodiment of the present invention, service provider 101 may obtain promotional information prepared for its stores from one or more advertising affiliates 104. This promotional information may be stored in database 103, which is accessible by one or more server computers 102. When a customer requests a POS receipt (e.g. because the customer has made a purchase, or has requested a receipt for a returned purchase) the customer may approach a cashier or even a self-help kiosk that includes device 106.

Device 106 may be any computing device including a computer-readable medium with one or more sets of instructions configured for providing customers with a measuring tool integrated with a POS receipt, promotional information, transactional data, or a combination of such. The computing device may comprise a modern cashier register with computing and printing capabilities, a desktop computer connected to a printer, a laptop computer connected to a printer, or even a mobile device or any other computing device with access to a printing device suitable for printing out registrable information such as transactional and or promotional information on a printing medium.

For example, and without limiting the scope of the present invention, the computing device may include a kiosk with a touch display and a printing device for printing printed sheets. In the exemplary embodiment of FIG. 1, device 106 may be a modern cash register configured to register transactional information, access the promotional information from database 103, and print the promotional information and transactional data on a printed sheet in order to generate POS receipt 107.

This way, the customer is provided with a disposable measuring tool free of charge, and at a negligible cost to the service provider. The customer can benefit from a receipt that may be used as a measuring tool during a follow-up purchase. Customers that know the store to provide these services, will no longer hesitate to request the measuring tool next time they realize that they may need to measure a product being considered for a purchase. Moreover, the service provider may use the coupons or promotional information provided on POS receipt 107 as a means to pay for the printed sheets. Furthermore, a service provider may offer the advertising space on POS receipt 107 as means of generating additional revenue.

Of course, providing the measuring tool need not be limited to the medium of POS receipt 107—situations that require the customer to purchase or return an item. For example, the service provider may provide kiosks at which a customer may request a predetermined length of a printed sheet that includes the measurement marks but perhaps does not include transactional data. In such embodiments, the customer may access device 106 and simply input the length requested (such as a foot, a meter, a yard, etc.) and device 106 may print out a printed sheet that includes borders wherein measurement markings are printed for use as a measuring tool. In some embodiments, device 106 may request certain information from the customer such as an email, phone number, or any other identifying information to provide to advertising affiliates 104 or for the service provider's targeted marketing strategies. In other embodiments, no information from the customer is required but the customer may need to scan a rewards or membership card associated with the service provider or the store. In yet other embodiments, device 106 prints out a printed sheet including the measuring tool requested by the customer without obtaining any customer information whatsoever.

Naturally, other embodiments need not be so complex as system 100. For example, device 106 may include a local memory with any required pricing and or promotional information stored therein. As such, even though system 100 is shown with server 102 and database 103 in communication with device 106, in alternative embodiments, device 106 is simply a standalone device that does not require a connection to a network such as network 105.

Similarly, the gathering and dissemination of the promotional information may vary from one embodiment to another. For example, and without limiting the scope of the present invention, in one embodiment, the promotional information provided on POS receipt 107 may be associated with a purchased item. In another embodiment, the promotional information provided on POS receipt 107 is associated with a location relevant to the customer. In another embodiment, the promotional information provided on POS receipt 107 is associated with a location relevant to the store. In yet another embodiment, the promotional information provided on POS receipt 107 is associated with a profile of the customer using device 106. In yet other embodiments, the promotional information need not be provided on POS receipt 107.

In a very basic embodiment, the present invention may be implemented with regular cashier or register machines, as well as receipt printing devices that are commonly used without requiring a server, a kiosk, or a particularly type of POS device. For example, and without limiting the scope of the present invention, system 100 may simply entail regular cashier machines connected to or integral with a receipt printer, which are loaded with receipt paper rolls, or receipt paper that may be pre-printed with measurement markings on the margins.

In one exemplary embodiment, system 100 is a system for providing a measurement tool on a printed medium, comprising: a computing device with access to a database including promotional information associated with one or more products; and a printing device in communication with the computing device, wherein the computing device is configured to: register transactional data associated with a product purchase from a customer; retrieve the promotional information associated with one or more products; and generate a printed medium of a predetermined length, the printed medium including the promotional information, and a plurality of measurement markings longitudinally printed along one or more borders of the printed medium.

In another exemplary embodiment, system 100 is a system for providing a measurement tool on a printed medium, comprising: a server with a database including promotional information from one or more advertising affiliates; and a computing device in communication with the server via a network, wherein the computing device is configured to: receive transactional data from a customer; receive the promotional information from the one or more advertising affiliates; and generate a printed medium of a predetermined length, the printed medium including the transactional data, the promotional information, and a plurality of measurement markings longitudinally printed along one or more borders of the printed medium.

In yet another exemplary embodiment, system 100 is a system for providing a measurement tool on a printed medium, comprising: a server with a database including promotional information from one or more advertising affiliates; and a point of sale (POS) device in communication with the server via a network, wherein the POS device is configured to: receive transactional data from a customer, receive the promotional information from the one or more advertising affiliates, and generate a printed medium of a predetermined length, the printed medium including the transactional data, the promotional information, and a plurality of measurement markings longitudinally printed along one or more borders of the printed medium.

In yet another exemplary embodiment, system 100 is a system for providing a measurement tool on a printed medium, comprising: a POS device including a database of promotional information, wherein the POS device is configured to: receive a request for a printed medium of a predetermined length, access the promotional information, and generate the printed medium of said predetermined length, the printed medium including the promotional information, and a plurality of measurement markings longitudinally printed along one or more borders of the printed medium.

As may be appreciated by one skilled in the art, many variations on the components of system 100 may be achieved without deviating from the scope of the present invention.

Figure 1B:
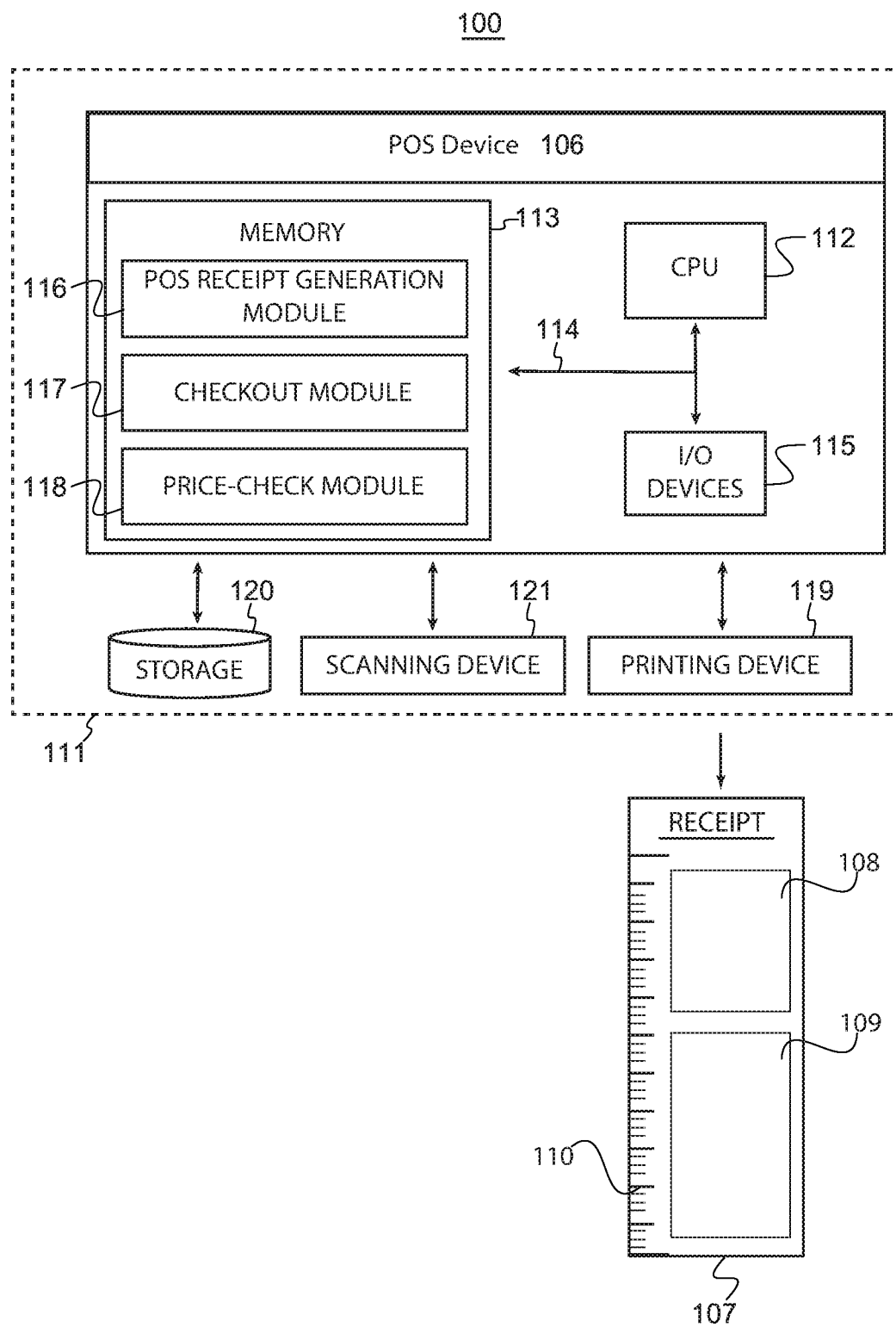
FIG. 1(b) illustrates a system in accordance with an exemplary embodiment of the present invention.

Turning now to FIG. 1(*b*), another exemplary embodiment of system 100 is illustrated. As depicted, system 100 includes POS device 106 deployed within a computer framework 111. This is intended to demonstrate, among other things, that the present invention could be implemented within a network environment (e.g., the Internet, a wide area network (WAN), a local area network (LAN), a virtual private network (VPN), etc.), or on a stand-alone computer system. In one exemplary embodiment, any combination of various types of communications links may be implemented to achieve communication throughout the network. For example, and without deviating from the scope of the present invention, communication throughout the network may comprise any combination of known wired or wireless transmission methods.

Computer framework 111 is illustrative of various types of computer infrastructures for implementing the invention. For example, in one embodiment, computer framework 111 comprises two or more computing devices (e.g., a server cluster) that communicate over a network to perform the various process of the invention. In another embodiment, computer framework 111 is a single, stand-alone computer system housed inside a single housing such as a kiosk with an enclosure that includes POS device 106. Moreover, POS device 106 is only representative of various possible computer systems that can include numerous combinations of hardware. To this extent, in other embodiments, POS device 106 may comprise any computing device comprising hardware and/or computer program code for performing specific functions. In each case, the program code and hardware can be created using standard programming and engineering techniques, respectively.

In the illustrated embodiment, POS device 106 comprises one or more processors or CPU 112, a memory 113, a bus 114, and input/output interfaces (or I/O 115). Further, POS device 106 is shown configured to communicate with printing device 119, storage system 120 and scanning device 121. Of course, other configurations that are readily recognizable to a person of ordinary skill in the art are possible. For example, in one embodiment printing device 119, storage system 120, and scanning device 121 may be integral with or directly coupled to POS device 106, while in other embodiments each of these devices may be a separate device in wireless communication with POS device 106.

CPU 112 may comprise a single processing unit, or be distributed across one or more processing units in one or more locations, e.g., on a client and server. Similarly, memory 113 and/or storage system 120 can comprise any combination of various types of data storage and/or transmission media that reside at one or more physical locations. Further, I/O 115 can comprise any module for exchanging information with one or more external devices such as printing device 119, storage 120, and/or scanning device 121.

Storage system 120 may be any type of device or system capable of providing storage for information required under the present invention including inventory item information, price information, bar codes or other product identifiers, and any other information that may be useful at a POS device such as a cash register or product information kiosk. To this extent, storage system 120 could include one or more storage devices, such as a magnetic disk drive or an optical disk drive. In another embodiment, storage system 120 includes data distributed across, for example, a local area network (LAN), wide area network (WAN) or a storage area network (SAN) (not shown). In addition, although not shown, additional components, such as cache memory, communication systems, system software, etc., may be incorporated into POS device 106. As mentioned above, storage system 120 may be coupled either externally or internally to POS device 106. For example, storage system 120 may be one or more long term memory storage devices, such as a hard drive, disk drive, tape unit, Network Attached Storage (NAS) device, Storage Attached Network (SAN) device, RAID disk array, or optical disk array. Although typically a long-term memory storage device, storage system 120 may be any other memory device without departing from the scope of the present invention. In an exemplary embodiment, storage system 120 is striped across redundant storage containers or RAID disk array in a SAN environment for increased data access speeds and robustness. Of course, any other storage configuration would not deviate from the scope of the present invention so long as storage system 120 is suitable for the needs of POS device 106. In one exemplary embodiment, storage system 120 is a cloud-based storage solution suitable to host one or more databases for a system managed by computer framework 111.

The databases of storage system 120 may be created by a known database manager using known technologies such as relational architecture and SQL access, such as Microsoft™ SQL or Oracle™ DB. However, the database of storage system 120 may be as simple as a series of files stored in a directory, with a text file listing filename locations without departing from the scope of the present invention. In one embodiment, the one or more databases of storage system 120 may be a combination of a known database manager, and an organized directory tree structure, wherein the database manager stores text information in the database itself, but stores multimedia information and other non-text information as filename locations of files stored in an organized directory tree structure.

In an embodiment, wherein computer framework 111 relies on cloud computing, storage system 120 may include technologies offered by Amazon™ such as Amazon™ Elastic Compute Cloud (AWS EC2), whereby storage system 120 may employ MySQL™ and AWS EC2™ instances. The one or more databases of storage system 120 may hold multiple data repositories corresponding to: inventory information, item or product pricing information, price reduction information, bar codes or other product identifiers, and any other useful information that may be made available to employees and or customers at a POS machine such as a cash register or a pricing kiosk.

Scanning device 121 may be any scanning device such as a handheld scanner that is suitable for scanning barcodes or other product identifiers. As mentioned above, scanning device 121 may be a separate device or integral device with POS device 106. In an exemplary embodiment, scanning device 121 is housed with POS device 106. In another exemplary embodiment, scanning device 121 is a separate handheld scanner in communication with POS device 106 wherein POS device 106 comprises a cash register.

Printing device 119 may be any printing device such as a stand-alone printer in communication with POS device 106 or a printing device that is integral with POS device 106. In an exemplary embodiment, printing device 119 is housed with POS device 106, wherein POS device 106 is housed in a kiosk. In another exemplary embodiment, printing device 119 is a separate printer in communication with POS device 106, wherein POS device 106 comprises a cash register.

In general, CPU 112 executes one or more executable instructions or computer program code, such as a POS receipt generation program, a checkout program, and/or a price-check program. These executable programs may be included in a single software or may be separate software modules stored in memory 113 and/or storage system 120. In the illustrated embodiment, POS receipt generation module 116, checkout module 117, and price-check module 118 are separate sets of programmable instructions reside in a local memory 113 of POS device 106.

Typically, CPU 112 will read and/or write data to/from memory 113, storage system 116, and/or input/output devices 115; bus 114 provides a communication link between each of the components in or configured to communicate with POS device 106. Although POS device 106 is shown in communication with a single printing device 119, POS device 106 may communicate with: one or more external devices such as a cash register, a keyboard, a pointing device, a display, or any other one or more devices that enable a user to interact with POS device 106. Depending on the installation of POS device 106, or the configuration of computer framework 111, POS device may further include one or more devices such as network cards, modems, etc. that enable POS device 106 to communicate with one or more other computing devices.

The programmable instructions or software modules generally provide functions of the present invention as described herein. For example, and without limiting the scope of the present invention, POS receipt generation module 116 may be configured to: receive a scan of a barcode of an item via scanning device 121; determine an identity of the item based on the barcode; display information (for example, a price) associated with the item via a display coupled to POS device 106; and print, via printing device 119 on a printing medium the information associated with the item, wherein the printed medium may include a plurality of measurement markings longitudinally situated along the vertical boarders of the printed medium. In one exemplary embodiment, POS receipt generation module 116 is configured to: receive a scan of a barcode of an item from the scanner; determine an identity of the item based on the barcode; and generate a printed medium comprising: a printing medium; price information associated with the item printed on the printing medium; and a plurality of measurement markings situated along a longitudinal border of the printing medium.

Referring now to FIG. 2, a method in accordance with the present invention is illustrated. More specifically, FIG. 2 depicts method 200 typically performed by a computing device including a computer-readable medium with one or more sets of instructions configured to generate measuring tool integrated with a POS receipt. It should be noted that although method 200 is shown in a series of steps, other conceivable sequence of the steps may be practiced without deviating from the scope of the present invention.

In step 201, a request may be received via a user interface of a computing device in accordance with the present invention. Accordingly, in exemplary practice of the present invention, a service provider or store may provide one or more stations or kiosks at a store location which customers may access. Via the displays, a customer may request a predetermined length of a printed sheet. Alternatively, the request of step 201 may be received at a cashier register, wherein the user is a cashier entering transactional information in preparation for a transaction. In either embodiment, the request for a printed medium including the measurement tool is received at step 201.

In step 202, a user interface at the kiosk or station may request data from the customer. As mentioned above, this may not be necessary and in some embodiments, step 202 may be skipped. Alternatively, this customer data may be utilized to better focus any promotional information that may be provided to the customer on the printed medium.

In step 203, relevant promotional information may be retrieved from a database accessible to the device. Although this step is also optional, in exemplary embodiments, information requested and received at step 202 may be used to access the promotional data relevant to the requesting customer.

In yet other embodiments, steps 202 and or 203 may further include receiving transactional information concerning a product purchased or inquired about by the customer. For example, and without limiting the scope of the present invention, a customer may approach a kiosk prior to making a purchase, with the intention of making a purchase, or after picking an item and using the kiosk to purchase the item. Accordingly, transactional information associated with the purchase may also be retrieved at this time. In such embodiments, steps 202 and or 203 may further include retrieving a purchase price for an item being purchased.

In step 204, the customer may be prompted to select a predetermined length, or the computing device may have a set of instructions with a predetermined length of the printout depending on the purchased items, a set minimum length, or any other type of parameter that sets a predetermined length, without deviating from the scope of the present invention.

In step 205, the computing device may generate the printed medium and print out a printed sheet that includes: the transactional data (if a purchase was registered during the request for the printed measurement tool); the advertising or promotional data (if the service provider has elected to provide customers with this information); and the measurement markings along a longitudinal edge of the printed sheet that makes up the printed medium or POS receipt.

In one exemplary embodiment, method 200 is a method performed by a computing device configured to generate a measurement tool with a POS receipt, comprising: registering transactional data associated with a product purchase from a customer; receiving promotional information from one or more advertising affiliates; and generating a printed medium of a predetermined length, the printed medium including the transactional data, the promotional information, and a plurality of measurement markings longitudinally printed along one or more borders of the printed medium.

In another exemplary embodiment, method 200 is a method performed by a POS device configured to generate a measurement tool, comprising: receiving promotional information from one or more advertising affiliates; and generating a printed medium of a predetermined length, the printed medium including the promotional information, and a plurality of measurement markings longitudinally printed along one or more borders of the printed medium.

In yet another exemplary embodiment, method 200 is a method performed by a computing device configured to generate a measurement tool, comprising: generating a printed medium of a predetermined length, the printing medium including a plurality of measurement markings longitudinally printed along one or more borders of the printed medium.

As may be appreciated by one skilled in the art, many variations on the steps, or the complexity of the steps of method 200 may be achieved without deviating from the scope of the present invention.

Figure 3A:
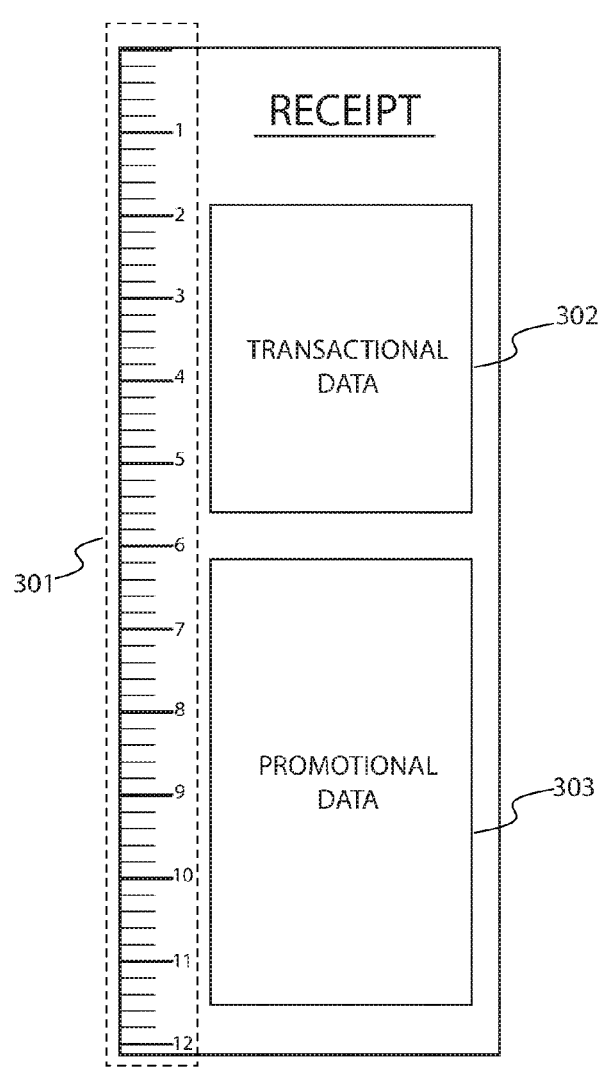
FIG. 3(a) illustrates one embodiment of a measuring tool integrated with a POS receipt, in accordance with one exemplary embodiment of the present invention.
Figure 3B:
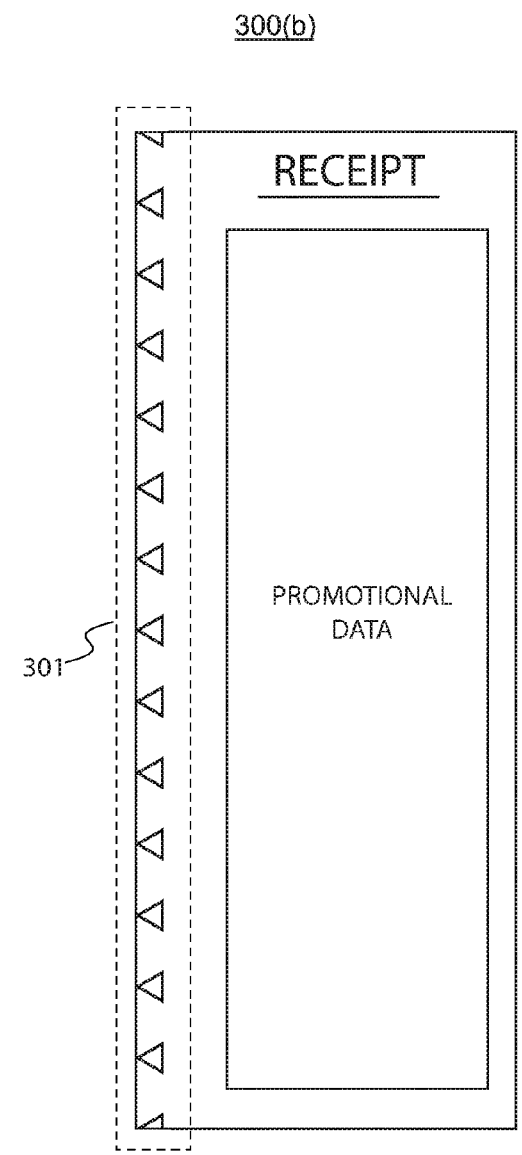
FIG. 3(b) illustrates another embodiment of a measuring tool integrated with a POS receipt, in accordance with one exemplary embodiment of the present invention.

Turning now to the next figures, FIG. 3(a) illustrates one embodiment of a measuring tool integrated with a POS receipt, in accordance with the present invention, and FIG. 3(b) illustrates another embodiment of a measuring tool integrated with a POS receipt, in accordance with the present invention. Measuring tools 300(a) and 300(b) are shown as printed POS receipts that include promotional data. Of course, in alternative embodiments the promotional data need not be provided, and a customer may simply obtain a long strip of printed sheet that includes the measurement marks or printed measurement tool.

In exemplary embodiments, the measuring tools may include printed mediums or printed sheets that comprise: one or more marginal markings 301 comprising measurement marks along a longitudinal margin or border of the printed sheet; transactional data 302, which may include transactional information concerning a registered purchased item or product, or a price for a requested item; and or promotional data 303, which may include promotional information such as advertisements, coupons, or any other promotional material that a service provider may desire to provide its customers.

Figure 4:
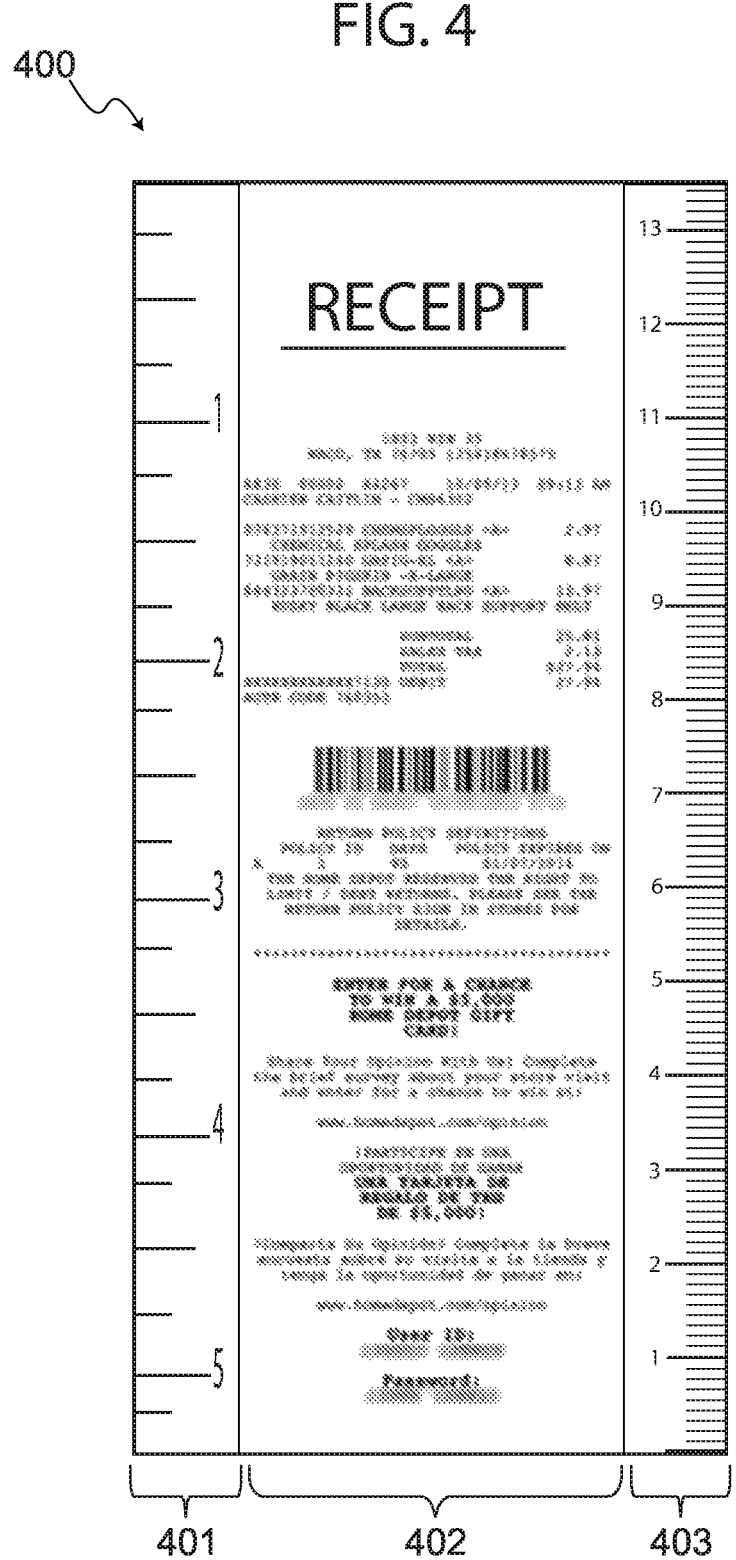
FIG. 4 illustrates yet another embodiment of a measuring tool integrated with a POS receipt, in accordance with one exemplary embodiment of the present invention.

Although not shown as such in the current figure, marginal markings 301 may be provided vertically along both longitudinal borders of the printed sheet (see FIG. 4), or along a single border (as shown in the current figure) of the printed sheet, or around the entire perimetrical border of the printed sheet (not shown), without deviating from the scope of the present invention.

Moreover, as illustrated by both embodiments, the markings may range from lines with numbers, to symbols that may indicate to the customer-user a particular unit of length that the user may use as a measurement tool.

The printing medium may be any type of printable sheet or substrate suitable for printing receipts, including but not limited to thermal paper. For example, in one embodiment, the paper medium is constructed of well-known sheets including coatings of the chemical bisphenol A or BPA, which allows inkless printing for receipts from cash registers. Alternatively, other ink-based printing means may be implemented without deviating from the scope of the present invention.

In one exemplary embodiment, measuring tools 300(a) or 300(b) may be printed with a computing device and comprise of: a printing medium including horizontal and vertical borders; transactional or promotional data printed on the printing medium; and a plurality of measurement markings longitudinally situated along the vertical boarders of the printing medium.

In another exemplary embodiment, measuring tools 300(a) or 300(b) may be printed with a computing device and comprise of: a printed sheet including a length with one or more longitudinal borders, the printed sheet a medium suitable for a POS receipt and including: horizontal and vertical borders; and a plurality of measurement markings longitudinally situated along one or more of the vertical boarders of the printed sheet.

As mentioned above, the plurality of measurement markings on measuring tools 300(a) and 300(b) (i.e. marginal markings 301) may be printed by a device in response to a purchase, a request for a receipt, a request for a print-out of the measurement tool at a kiosk, or may be previously printed on the printing sheets so that the POS device providing a customer with the measurement tools already includes printing sheets with the markings pre-printed, and only prints out any other information such as transactional data 302 and or promotional data 303. In an exemplary embodiment, such as shown in FIG. 3(a), the marginal markings 301 may comprise of a first set of marginal markings having a first length and a second set of marginal markings having a second length, the second set of marginal markings situated in-between the first set of marginal markings, wherein the second set of marginal markings have a shorter length than the first set of marginal markings.

In an exemplary embodiment, POS receipt may include a first longitudinal margin 401 including measurement markings situated parallel to the propagation of the receipt, but perpendicular to the printed material portion 402, and a second longitudinal margin 403 including measurement markings situated parallel to the propagation of the receipt, but perpendicular to the printed material portion 402. As such, in this embodiment, the measurement markings on the left side of POS receipt 400 may be used to measure a distance in centimeters, while the right side of POS 400 may be used to measure a distance in inches.

As may be appreciated by one skilled in the art, many variations on a measurement tools in accordance with the present disclosure may be achieved without deviating from the scope of the invention.

A system and method for providing a measurement device with a POS receipt has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A system for providing a measurement tool at a point of sale (POS), comprising:
   a scanner;
   a computing device in communication with the scanner, the computing device configured to:
      receive a scan of a barcode of an item from the scanner; determine an identity of the item based on the barcode; and
      print a POS measurement tool, comprising:
         a printing medium;
         price information associated with the item printed on the printing medium; and
         a plurality of measurement markings situated along a longitudinal border of the printing medium, the plurality of measurement markings comprising a first set of marginal markings having a first length and a second set of marginal markings having a second length, the second set of marginal markings situated in-between the first set of marginal markings, wherein the second set of marginal markings have a shorter length than the first set of marginal markings, and wherein each of the plurality of measurement markings is substantially perpendicular to the longitudinal border of the printing medium and equally spaced apart vertically using a first system of measurement.

2. The system of claim 1, wherein the first system of measurement is a Metric system of measurement.

3. The system of claim 1, wherein the first system of measurement is an English system of measurement.

4. The system of claim 1, wherein the POS measurement tool further comprises:
   a second plurality of measurement markings situated along a second longitudinal border of the printing medium, each of the second plurality of measurement markings substantially perpendicular to the second longitudinal border of the printing medium and spaced apart vertically using a second system of measurement.

5. The system of claim 1, wherein:
   the plurality of measurement markings situated along a longitudinal border are pre-printed on the printing medium.

6. The system of claim 1, wherein:
   the plurality of measurement markings situated along a longitudinal border are printed on the printing medium after receiving the scan of the barcode of the item from the scanner.

7. The system of claim 1, wherein the POS measurement tool further comprises promotional information retrieved from a remote database in communication with the computing device, the promotional information printed adjacent to the price information.

8. The system of claim 1, wherein the computing device is further configured to:
   display the information associated with the item on a display coupled to the computing device.

9. A method performed by a computing device configured to generate a measurement tool, comprising:
   receiving a scan of a barcode of an item from a scanner;
   determining an identity of the item based on the barcode; and
   generating a printed medium comprising:
      a printing medium;
      price information associated with the item printed on the printing medium; and
      a plurality of measurement markings situated along a longitudinal border of the printing medium, the plurality of measurement markings comprising a first set of marginal markings having a first length and a second set of marginal markings having a second length, the second set of marginal markings situated in-between the first set of marginal markings, wherein the second set of marginal markings have a shorter length than the first set of marginal markings, and wherein each of the plurality of measurement markings is substantially perpendicular to the longitudinal border of the printing medium and equally spaced apart vertically.

10. The method of claim 9, further comprising:
   registering a transaction associated with the item prior to generating the printed medium; and
   including, on the printed medium, transactional data associated with the registered transaction, the transactional data adjacent to the plurality of the measurement markings.

11. The method of claim 9, further comprising:
   accessing promotional information associated with one or more advertising affiliates prior to generating the printed medium; and
   including, on the printed medium, the promotional information adjacent to the plurality of measurement markings.

12. The method of claim 9, wherein generating a printed medium further comprises:

printing each of the plurality of measurement markings using a Metric system of measurement.

13. The method of claim 9, wherein generating a printed medium further comprises:
printing each of the plurality of measurement markings using an English system of measurement.

14. The method of claim 12, wherein generating a printed medium further comprise:
printing a second plurality of measurement markings situated along a second longitudinal border of the printing medium, each of the second plurality of measurement markings substantially perpendicular to the second longitudinal border of the printing medium and spaced apart vertically using an English system of measurement.

15. The method of claim 13, wherein generating a printed medium further comprise:
printing a second plurality of measurement markings situated along a second longitudinal border of the printing medium, each of the second plurality of measurement markings substantially perpendicular to the second longitudinal border of the printing medium and spaced apart vertically using a metric system of measurement.

* * * * *